United States Patent
Han et al.

(10) Patent No.: US 9,485,083 B2
(45) Date of Patent: Nov. 1, 2016

(54) METHOD AND APPARATUS FOR TIME SYNCHRONIZATION BETWEEN NODES

(71) Applicant: Electronics and Telecommunications Research Institute, Daejeon (KR)

(72) Inventors: Jinsoo Han, Daejeon (KR); Chang Sic Choi, Daejeon (KR); Wan Ki Park, Daejeon (KR); Il Woo Lee, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 22 days.

(21) Appl. No.: 14/548,382

(22) Filed: Nov. 20, 2014

(65) Prior Publication Data

US 2015/0139664 A1    May 21, 2015

(30) Foreign Application Priority Data

Nov. 20, 2013 (KR) .................. 10-2013-0141676
Jul. 30, 2014 (KR) .................. 10-2014-0097609

(51) Int. Cl.
*H04J 14/00* (2006.01)
*H04L 7/00* (2006.01)
*H04J 14/02* (2006.01)
*H04J 3/06* (2006.01)

(52) U.S. Cl.
CPC ............ *H04L 7/0075* (2013.01); *H04J 14/02* (2013.01); *H04L 7/0008* (2013.01); *H04J 3/0658* (2013.01)

(58) Field of Classification Search
CPC ........................................... H04J 14/02
See application file for complete search history.

(56) References Cited

U.S. PATENT DOCUMENTS

| | | | | |
|---|---|---|---|---|
| 5,206,753 A * | 4/1993 | Grimes | ............. | H04Q 11/0001 398/154 |
| 5,764,396 A * | 6/1998 | Yoneyama | ............ | H04L 7/0075 398/154 |
| 6,195,186 B1 * | 2/2001 | Asahi | .................. | H04J 14/0201 398/5 |
| 6,512,616 B1 * | 1/2003 | Nishihara | .......... | H04Q 11/0005 370/528 |
| 7,151,630 B2 * | 12/2006 | Yamaguchi | ........ | H04B 10/0775 359/334 |
| 7,203,392 B2 * | 4/2007 | Tsuyama | ................ | H04B 10/40 385/14 |
| 7,212,744 B2 * | 5/2007 | Shiramizu | .......... | H03K 5/00006 375/355 |
| 7,336,906 B2 * | 2/2008 | Nesset | ................. | H04B 10/506 398/162 |
| 7,627,256 B2 * | 12/2009 | Tokunaga | .......... | H04B 10/0777 398/173 |
| 7,630,634 B1 * | 12/2009 | Boduch | ............... | H04J 14/0217 398/181 |
| 7,706,693 B2 * | 4/2010 | Nonaka | ................ | H04B 10/516 370/389 |
| 7,711,271 B2 * | 5/2010 | Eiselt | ................. | H04B 10/0775 398/181 |

(Continued)

FOREIGN PATENT DOCUMENTS

KR    1019990053397 A    7/1999
KR    102011056087 A    5/2011

(Continued)

*Primary Examiner* — Danny Leung
(74) *Attorney, Agent, or Firm* — William Park & Associates Ltd.

(57) ABSTRACT

A method and apparatus for time synchronization between a plurality of nodes in a network. The apparatus distinguishes between an optical synchronization signal for synchronization between nodes and an optical data signal for data transmission, and synchronizes nodes with each other using the optical synchronization signal.

19 Claims, 9 Drawing Sheets

(56) References Cited

U.S. PATENT DOCUMENTS

| | | | | |
|---|---|---|---|---|
| 2004/0008719 A1* | 1/2004 | Ying | ................ | H04L 12/422 370/460 |
| 2004/0008720 A1* | 1/2004 | Wang | ................ | H04L 12/422 370/460 |
| 2004/0008721 A1* | 1/2004 | Ying | ................ | H04L 12/422 370/460 |
| 2006/0171329 A1* | 8/2006 | Ying | ................ | H02J 13/0062 370/254 |
| 2010/0265936 A1* | 10/2010 | Yeh | ................ | H04J 3/0658 370/350 |
| 2013/0215753 A1* | 8/2013 | Le Pallec | ................ | H04J 3/0667 370/235 |
| 2015/0139664 A1* | 5/2015 | Han | ................ | H04J 14/02 398/154 |

FOREIGN PATENT DOCUMENTS

| | | |
|---|---|---|
| KR | 1020130090907 A | 8/2013 |
| KR | 1020130111603 A | 10/2013 |
| KR | 1020130116392 A | 10/2013 |
| WO | 2012094064 A1 | 7/2012 |

\* cited by examiner

METHOD AND APPARATUS FOR TIME SYNCHRONIZATION BETWEEN NODES

CROSS-REFERENCE TO RELATED APPLICATION(S)

This application claims priority from Korean Patent Application Nos. 10-2013-0141676, filed on Nov. 20, 2013, and 10-2014-0097609, filed on Jul. 30, 2014, in the Korean Intellectual Property Office, the disclosures of which are incorporated herein by references in its entirety.

BACKGROUND

1. Field

The following description relates to a network including a plurality of nodes, and more particularly to synchronization between nodes.

2. Description of the Related Art

Various methods are used to synchronize remotely placed devices with each other. In a case of using a global positioning system (GPS), synchronization between terminals is carried out to enable the terminals to have the same reference time. To this end, stationary access points (AP) which receive timing information from global navigation satellite system (GNSS) synchronize with each other, and thereafter network devices connected to each particular AP are synchronized with each other using pseudo-ranging mechanism. In addition, there is a method in which a mobile terminal equipped with a GPS receiver function receives time information and transmits the received time information to other devices connected to the mobile terminal, enabling the other devices to update their time.

In a packet switched data network, there may be used a method for clock synchronization in which a time for transmission between a master node and a slave node is determined through synchronization packets, allowing the transmission time among the nodes to be the same. In addition, there is a method for time synchronization between a clock of a master node, a clock of a bridge node, and a clock of a slave node through a synchronization message and a delay request message by using standard time transmission protocol.

The synchronization method using GPS, however, is inconvenient since a GPS needs to act as a reference clock and all nodes are thereby required to receive GPS signals. The synchronization method using synchronization packets may cause nodes to have a time delay and synchronization errors when processing packets since a physical layer (OSI layer 1) and a data-link layer (OSI layer 2) need to be taken into consideration throughout the synchronization process in order to increase time precision.

SUMMARY

The following description relates to a method and apparatus for time synchronization between a plurality of nodes in a network without a time delay and a synchronization error.

In one general aspect, there is provided a method for time synchronization between a plurality of nodes in a network, the method including: separating an optical signal into an optical synchronization signal for node synchronization and an optical data signal for data transmission; transmitting the optical data signal along a data path; transmitting the optical synchronization signal along a path different from the data path; and synchronizing time between the nodes using the optical synchronization signal.

The transmitting of the optical synchronization signal may include transmitting the optical synchronization signal through optical distribution along the path different from the data path.

The transmitting of the optical synchronization signal may include transmitting the optical synchronization signal through opto-electrical conversion and electro-optical conversion along the path different from the data path.

The optical synchronization signal may have a wavelength different from a wavelength of the optical data signal.

The nodes may be connected to each other via an optical cable.

In another general aspect, there is provided a method for time synchronization between nodes, the method including: multiplexing, at a first node, an optical synchronization signal with an optical data signal and transmitting a resultant multiplexed optical signal to a second node; receiving, at the second node, the resultant multiplexed optical signal, demultiplexing the received optical signal to separate it into an optical synchronization signal and an optical data signal, performing data processing on the separated optical data signal, and multiplexing the data-processed optical data signal with the separated optical synchronization signal, and transmitting a resultant multiplexed optical signal to a third node; and receiving, at the third node, the resultant multiplexed optical signal, demultiplexing the received multiplexed optical signal to separate it into an optical data signal and an optical synchronization signal, and synchronizing time between the nodes using an synchronization signal in form of an electrical signal which is extracted from the separated optical synchronization signal.

The transmitting of the resultant multiplexed optical signal to the second node may include: producing the optical synchronization signal, dividing the produced optical synchronization signal into a plurality of optical synchronization signals, and multiplexing each of the plurality of divided optical synchronization signals with the data optical signal and transmitting the resultant multiplexed optical signal to the second node.

The plurality of divided optical synchronization signals may have the same properties, but different optical powers according to a division ratio.

The transmitting of the resultant multiplexed optical signal to the third node may include: receiving, at the second node, the multiplexed optical signal from the first node, demultiplexing the received multiplexed optical signal to separate it into the optical data signal and the optical synchronization signal, dividing the separated optical synchronization signal into a plurality of optical synchronization signals, performing the data-processing on the separated optical data signal, and multiplexing each of the plurality of divided optical synchronization signals with the data-processed optical data signal and transmitting the resultant multiplexed optical signal to the third node.

The plurality of divided optical synchronization signals may have the same properties, but different optical powers according to a division ratio.

The transmitting of the resultant multiplexed optical signal to the third node may include: receiving, at the second node, the multiplexed optical signal from the first node, demultiplexing the received multiplexed optical signal to separate it into the optical data signal and the optical synchronization signal, opto-electrically converting the separated optical synchronization signal into an electrical signal, and electro-optically converting the converted electrical signal into a plurality of optical synchronization signals, performing the data processing on the separated optical data signal, and multiplexing each of the plurality of electro-optically converted optical synchronization signals with the data-processed optical data signal and transmitting the resultant multiplexed optical signal to the third node.

The synchronizing of the time between the nodes may include: receiving, at the third node, the multiplexed optical signal from the second node, demultiplexing the received multiplexed optical signal to separate it into the optical data signal and the optical synchronization signal, opto-electrically converting the separated optical synchronization signal to extract the synchronization signal in form of an electrical signal, and synchronizing time between the nodes using the extracted synchronization signal in form of an electrical signal.

In yet another general aspect, there is provided an apparatus for time synchronization between a plurality of nodes in a network, the apparatus including: an optical synchronization signal creator configured to multiplex an optical synchronization signal and an optical data signal and externally transmit a resultant multiplexed optical signal; an optical synchronization signal distributor configured to receive the multiplexed optical signal from the optical synchronization signal creator, demultiplex the received multiplexed optical signal to separate it into an optical data signal and an optical synchronization signal, perform data processing on the separated optical data signal, multiplex the separated optical synchronization signal with the data-processed optical data signal, and externally transmit a resultant multiplexed optical signal; and an optical synchronization signal processor configured to receive the multiplexed optical signal from the optical synchronization signal distributor, demultiplex the received multiplexed optical signal to separate it into an optical data signal and an optical synchronization signal, extract an optical synchronization signal in form of an electronic signal from the separated optical synchronization signal, and synchronize time between the nodes using the extracted synchronization signal in form of an electrical signal.

The optical synchronization signal creator may include: an optical synchronization signal generator configured to generate the optical synchronization signal; an optical distributor configured to divide the optical synchronization signal generated by the optical synchronization signal generator into a plurality of optical synchronization signals; and at least one multiplexer configured to multiplex each of the plurality of divided optical synchronization signals with the optical data signal and externally transmit a resultant multiplexed optical signal.

The plurality of divided optical synchronization signals from the optical distributor may have the same properties, but different optical powers according to a division ratio.

The optical synchronization signal distributor may include: a multiplexer configured to receive the multiplexed optical signal from an upper node, and demultiplex the received multiplexed optical signal to separate it into an optical data signal and an optical synchronization signal; an optical distributor configured to divide the separated optical synchronization signal into a plurality of optical synchronization signals; and at least one multiplexer configured to multiplex each of the plurality of divided optical synchronization signals with the data-processed optical data signal and externally transmit a resultant multiplexed optical signal.

The plurality of divided optical synchronization signal from the optical distributor may have the same properties, but different optical powers according to a division ratio.

The optical synchronization signal distributor may include: a multiplexer configured to receive a multiplexed optical signal from an upper node and demultiplex the received multiplexed optical signal to separate it into an optical data signal and an optical synchronization signal; an opto-electrical converter configured to opto-electrically convert the optical synchronization signal separated by the multiplexer into an electrical signal; an electro-optical converter configured to electro-optically convert the electrical signal from the opto-electrical converter into a plurality of optical synchronization signals; and at least one multiplexer configured to multiplex each of the plurality of optical synchronization signals from the electro-optical converter with a data-processed optical signal and externally transmit a resultant multiplexed optical signal.

The optical synchronization signal processor may include: a multiplexer configured to receive a multiplexed optical signal from an upper node and demultiplex the received multiplexed optical signal to separate it into an optical data signal and an optical synchronization signal; and an opto-electrical converter configured to opto-electrically convert the optical synchronization signal separated by the multiplexer and extract an synchronization signal in form of an electrical signal, and the optical synchronization signal process is configured to synchronize time between the nodes using the extracted synchronization signal in form of an electrical signal.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
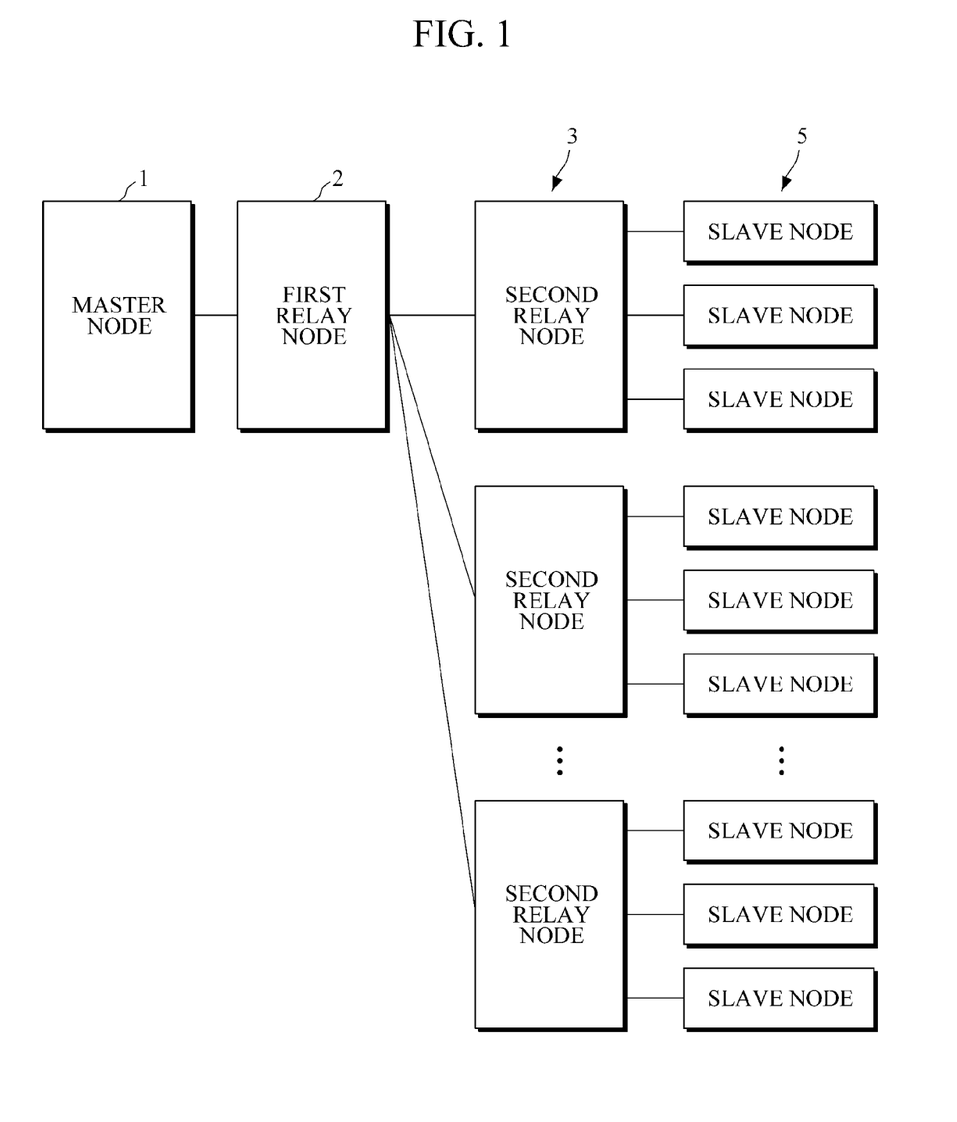
FIG. 1 is a diagram illustrating a network system consisting of a plurality of nodes in which an exemplary embodiment may be implemented.

FIG. 1 is a diagram illustrating a network system consisting of a plurality of nodes in which an exemplary embodiment may be implemented.

Referring to FIG. 1, the network system includes a master node 1, relay nodes 2 and 3, each of which delivers a synchronization clock received from the master node 1, and slave nodes 5 which receives the synchronization clock from the respective relay nodes 2 and 3 and synchronize with each other.

The nodes 1, 2, 3, and 5 are connected to each other via transmission media to transmit optical signals. The transmission media may be optical cables consisting of optical fibers. For example, connections between the master node 1 and a first relay node 2, between the first relay node 2 and each of the second relay node 3, and between the second relay node 3 and the slave nodes 5 are made via optical cables.

The master node 1 transmits and receives data to and from lower nodes through an optical transceiver. The first relay node 2 transmits and receives data to and from the master node 1 through the optical transceiver, and is connected to lower nodes through another optical transceiver.

The second relay node 3 transmits and receives data to and from an upper node through the optical transceiver. The upper node may be the master node 1 or the first relay node 2. The second relay node 3 performs opto-electrical conversion or electro-optical conversion to multiplex or demultiplex data. The second relay node 3 performs electro-optical conversion on a demultiplexed signal and transmits a resultant signal to the slave nodes 5.

Each of the second relay nodes 3 processes an optical signal received from an upper node, demultiplexes processed data, and transmits the demultiplexed data to a line card on a shelf through backplane. The second relay nodes 3 may include multiple line cards. The line card may receive a signal electrically from the backplane, convert the receives signal into a plurality of optical signals, and transmit the plurality of optical signals to the respective slave nodes 5.

As shown in FIG. 1, the network system may include both the first relay node 2 and the second relay nodes 3, or include only the first relay node 2 or the second relay nodes 3. In addition, there may be a plurality of first relay nodes 2 or a plurality of second relay nodes 3.

The slave node 5 may receive the optical signal from an upper node. The upper node may be the first relay node 2 or the second relay node 3. The slave node 5 may deliver data to an upper node in a direction opposite to the aforementioned direction. For example, the slave node 5 may transmit and receive data to and from the second relay node 3. The slave node 5 may use an optical transceiver for data transmission and reception.

Figure 2:
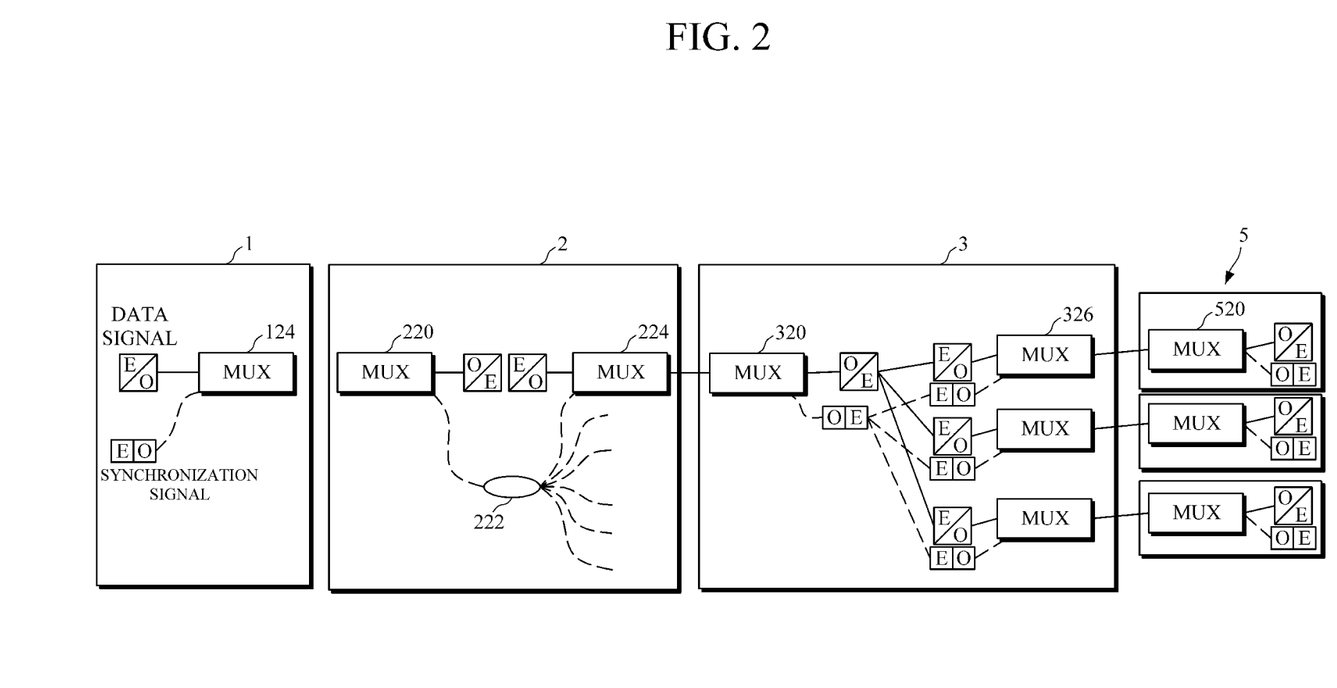
FIG. 2 is a diagram illustrating a network for time synchronization between nodes according to an exemplary embodiment.

FIG. 2 is a diagram illustrating a network for time synchronization between nodes according to an exemplary embodiment.

Referring to FIG. 2, the network includes a master node 1, a first relay node 2, a second relay node 3, and a slave node 5.

The master node 1 produces an optical synchronization signal for synchronization. The optical synchronization signal may be produced by an electro-optical converter. The optical synchronization signal may have a wavelength different from a wavelength of an optical data signal for data transmission. For example, in a case where the optical data signal has a wavelength of λ1, the optical synchronization signal may have a wavelength of λ2. This is to distinguish between the optical data signal and the optical synchronization signal, and differentiate between transmission paths.

The master node 1 may perform electro-optical conversion (E/O) and generate the optical data signal and optical synchronization signal. Electro-optically converted optical data signal and optical synchronization signal are multiplexed by a multiplexer 124. In the exemplary embodiment, a wavelength-division multiplexer (WDM) is used as the multiplexer 124, and the aspects of the present disclosure are not limited to a specific type of multiplexer. The master node 1 multiplexes the optical signal using the multiplexer 124, and transmits a resulting signal to a lower node, for example, the first relay node 2, via an optical cable.

The first relay node 2 receives the multiplexed optical signal, demultiplexes the received signal to separate an optical data signal and an optical synchronization signal. The optical synchronization signal passes through an optical distributor 222, such as an optical coupler, without optoelectrical conversion, to be split into a plurality of identical optical synchronization signals. The optical synchronization signals from the optical distributor 222 have the same physical properties as those of the initially input optical signal, and have only smaller optical power than that of the input optical signal as the optical power of the input optical signal is divided. The number of optical divisions may vary with the number of connected lower nodes.

The first relay node 2 performs opto-electrical conversion (O/E) on the optical data signal, performs electro-optical conversion on the converted optical data signal after data processing, and then transmits a resultant signal to a multiplexer 224. The multiplexer 224 receives the optical synchronization signal from the optical distributor 222 and the optical data signal which has been electro-optically converted after data processing, multiplexes the received optical synchronization signal and optical data signal, and transmits a resultant signal to a lower node.

The second relay node 3 receives the optical signal from the first relay node 2 through a multiplexer 320, demultiplexes the received optical signal to separate an optical data signal and an optical synchronization signal. The separated optical data signal is opto-electrically converted and has data processing performed thereon, then a resultant data signal is electro-optically converted by one or more electro-optical converters, and then the electro-optically converted data signal is output as an optical data signal. In this case, the number of electro-optical converters varies with the number of lower nodes. The optical synchronization signal separated by the multiplexer 320 is opto-electrically converted, and thereby being converted into a synchronization signal in the form of an electrical signal, and then the electrical-form synchronization signal is converted into multiple optical synchronization signals by a plurality of electro-optical converters. Each of the electro-optically converted optical data signals and each of the optical synchronization signals are multiplexed by a multiplexer 326 and then a resultant multiplexed signal is transmitted to the slave node 5.

As shown in FIG. 2, the second relay node 3 is provided for a concept of transmission of an optical synchronization signal after opto-electrical conversion and electro-optical conversion, and the aspects of the present disclosure are not limited thereto.

The slave node 5 separates the optical signal transmitted from the second relay node 3 into an optical data signal and an optical synchronization signal by demultiplexing the optical signal using a multiplexer 520. In this case, the optical data signal is converted into an electrical signal to be used in the slave node 5. The optical synchronization signal is also converted into an electrical signal to be used as a synchronization signal for data processing.

As described above with reference to FIG. 2, the optical synchronization signal is transmitted from the master node 1 to the slave node 5 along a different transmission path from a data transmission path. In this case, according to the transmission path of the optical synchronization signal, the optical signal is distributed without data processing, or simply opto-electrically converted or electro-optically converted. Accordingly, synchronization signals received by the respective slave nodes may have very small time delays or synchronization errors. A network time delay or synchronization error occurs when data are processed on a physical layer, a data-link layer, or a network layer. According to the exemplary embodiment, optical distribution is performed on the synchronization signals and simple opto-electrical conversion or electro-optical conversion is performed according to circumstances, so that it is possible to minimize a time delay or synchronization error between the synchronization signals, compared to the case where a data path needed for data processing is used.

Data which are transmitted from the slave node 5 to the master node 1 in synchronization with the synchronization signal may have minimum synchronization error. Transmission of data from the slave node 5 to the master node 1 is performed in the same manner as the transmission of data from the master node 1 to the slave node 5, but in the reverse direction, and thus detailed description thereof will not be reiterated.

Figure 3:
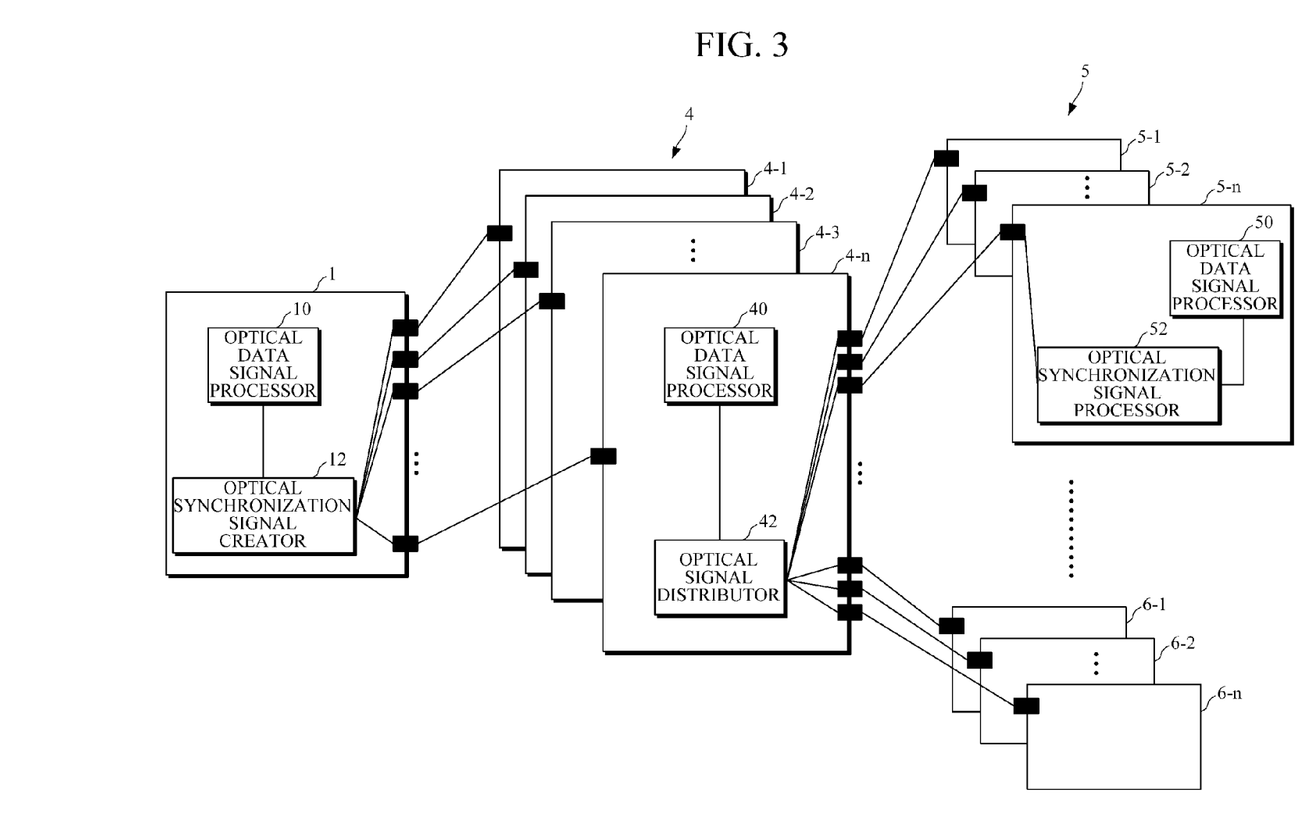
FIG. 3 is a diagram illustrating a network for processing an optical synchronization signal according to an exemplary embodiment.

FIG. 3 is a diagram illustrating a network for processing an optical synchronization signal according to an exemplary embodiment.

Referring to FIG. 3, a master node 1 includes an optical data signal processor 10 and an optical synchronization signal creator 12. The optical synchronization signal creator 12 produces an optical synchronization signal, multiplexes the produced optical synchronization signal with an optical data signal transmitted from the optical data signal processor 10, and then outputs a signal resulting from the multiplexing to a relay node 4 through an output port of the master node 1. The optical synchronization signal creator 12 may have inside an electro-optical converter to produce an optical synchronization signal.

The relay node 4 may include a plurality of relay nodes 4-1, 4-2, . . . , and 4-n, and each of the relay nodes 4-1, 4-2, . . . , and 4-n may include an optical data signal processor 40 and an optical signal distributor 42. The optical synchronization signal distributor 42 receives an is optical signal input from an upper node, for example, the master node 1, and separates the optical signal into an optical data signal and an optical synchronization signal. The separated optical data signal is delivered to the optical data signal processor 40. The separated optical synchronization signal is divided into one or multiple duplicated optical synchronization signals. The duplicated optical synchronization signals are multiplexed with the optical data signal transmitted from the optical data signal processor 40 after data processing, and then a resultant signal is delivered to a slave node 5. In this case, the optical data signal processor 40 may output one or multiple optical data signals. Each of the optical data signal and each of the divided optical synchronization signal may be multiplexed and a resultant signal may be transmitted to the slave node 5.

The slave node 5 includes a plurality of slave nodes 5-1, 5-2, . . . , and 5-n, and 6-1, 6-2, . . . , and 6-n, and each of the slave nodes 5-1, 5-2, . . . , and 5-n, and 6-1, 6-2, . . . , and 6-n includes an optical data signal processor 50 and an optical synchronization signal processor 52. The optical synchronization signal processor 52 receives an optical signal from an upper node, for example, the relay node 4-n, and separates the optical signal into an optical data signal and an optical synchronization signal. The separated optical data signal is delivered to the optical data signal processor 50. The optical synchronization signal processor 52 processes and converts the separated optical synchronization signal into an electric synchronization signal.

As described above, by using the optical synchronization signal creator 12, the optical synchronization signal distributor 42, and the optical synchronization signal processor 52, it is possible to transmit the synchronization signal from the master node 1 to the slave node 5 via the relay node 4 while minimizing synchronization error.

Figure 4:
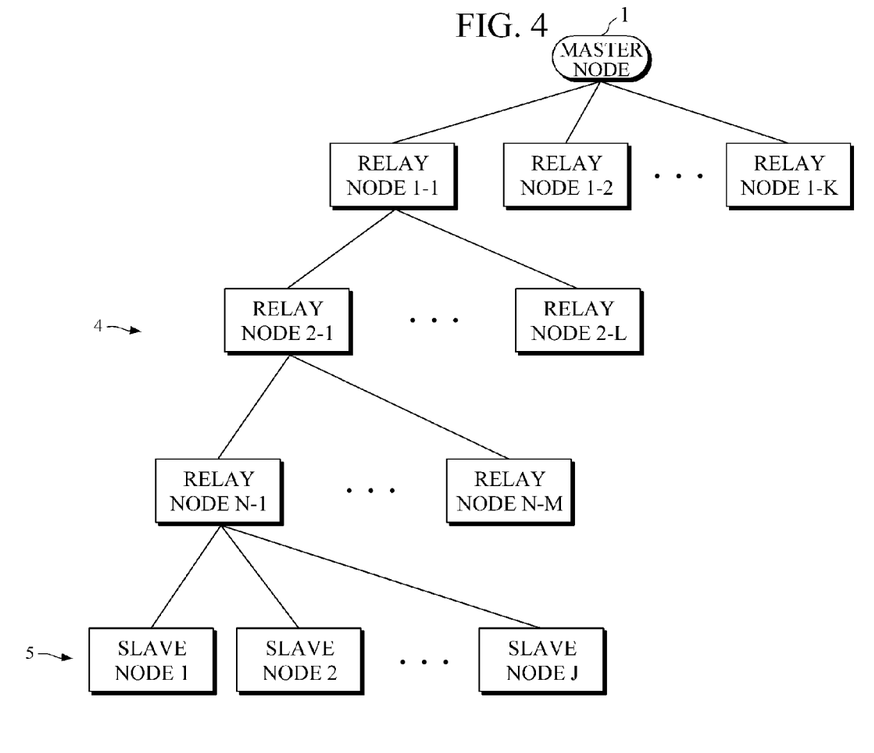
FIG. 4 is a diagram illustrating a network including a plurality of relay nodes according to an exemplary embodiment.

FIG. 4 is a diagram illustrating a network including a plurality of relay nodes according to an exemplary embodiment.

Referring to FIG. 4, the relay nodes 4 are related hierarchically to each other on different levels, and the relay nodes 4 on the same level are horizontally related to each other. For example, relay nodes 1-1, 1-2, . . . , and 1-k placed on the same level have a horizontal relationship with one another.

Slave nodes 5 receive the same optical synchronization signal from the master node 1, so that they can utilize the synchronization signal while minimizing a delay time. In such a structure, isochronous collection of data or states may be ensured as the slave nodes 5 collect the data or the states nearly simultaneously and at the same time.

Figure 5:
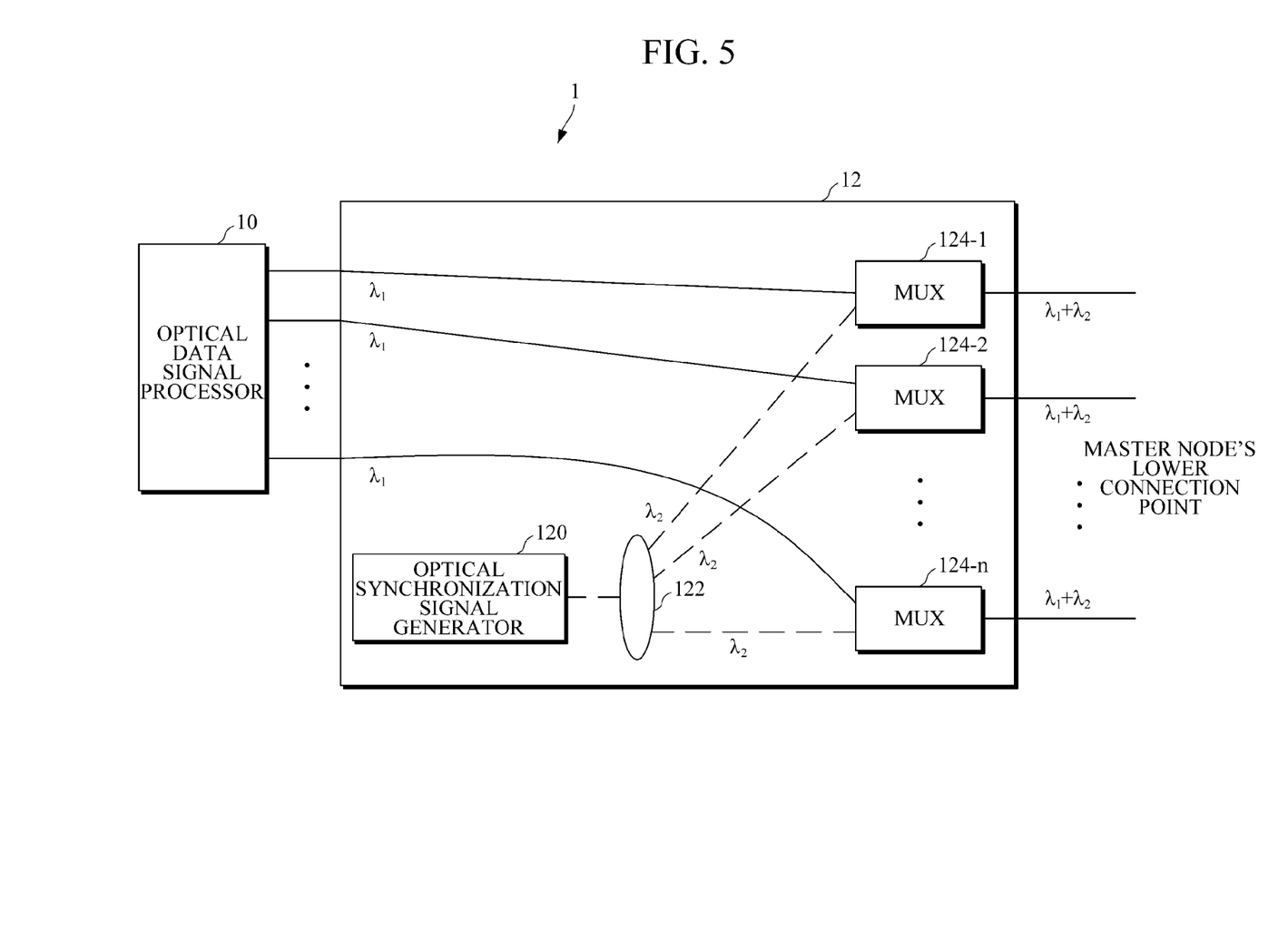
FIG. 5 is a diagram illustrating in detail an optical synchronization signal creator according to an exemplary embodiment.

FIG. 5 is a diagram illustrating in detail an optical synchronization signal creator according to an exemplary embodiment.

Referring to FIG. 5, a master node 1 includes an optical data signal processor 10 and an optical synchronization signal creator 12. The optical synchronization signal creator 12 includes an optical synchronization signal generator 120, an optical distributor 122, and multiplexers 124-1, 124-2, . . . , and 124-n. The optical synchronization signal creator 12 is connected to the optical data signal processor 10 via one or multiples optical cables.

The optical synchronization signal generator 120 produces an optical synchronization signal. The optical distributor 122 divides the optical synchronization signal provided from the optical synchronization signal generator 120 into a plurality of optical synchronization signals. The optical distributor 122 may be an optical coupler. All of the divided optical signals have the same properties while they have an optical power that is reduced according to a division ratio.

Each of the multiplexers 124-1, 124-2, . . . , and 124-n receives the optical data signal from the optical data signal processor 10, and receives the optical synchronization signal distributed by the optical distributor 122. Then, each of the multiplexers 124-1, 124-2, . . . , and 124-*n* multiplexes the received optical data signal and the optical synchronization signal and outputs a resultant signal. Each of the multiplexers 124-1, 124-2, . . . , and 124-*n* is connected to a lower connection point of the master node, and this connection point may be a point where the master node is connected to the relay node.

Figure 6:
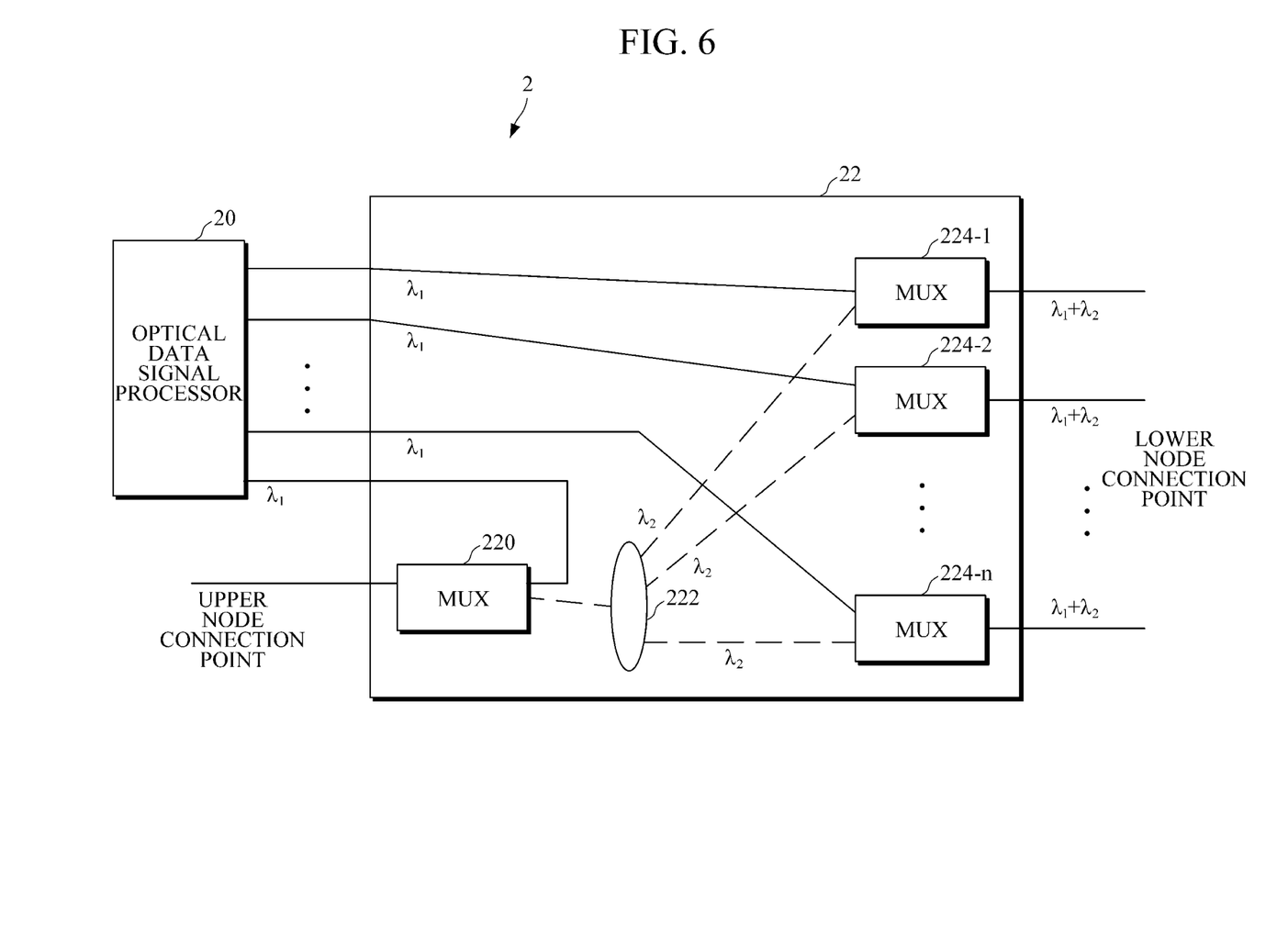
FIG. 6 is a diagram illustrating in detail an optical synchronization signal distributor according to an exemplary embodiment.

FIG. 6 is a diagram illustrating in detail an optical synchronization signal distributor according to an exemplary embodiment.

Referring to FIG. 6, the first relay node 2 includes the optical data signal processor 20 and the optical synchronization signal distributor 22, and the optical synchronization signal distributor 22 with a structure capable of distributing optical power without data processing of the optical synchronization signal includes multiplexers 220, 224-1, 224-2, . . . , and 224-*n* and an optical distributor.

The multiplexer 220 that is connected to an upper node, for example, the master node or another relay node, receives an optical signal from the upper, and demultiplexes the optical signal to separate an optical data signal and an optical synchronization signal. The multiplexer 220 is connected to an optical data signal processor 20 and inputs the separated optical data signal to the optical data signal processor 20. The optical data signal processor 20 performs data processing, determines to which lower node the optical data signal is delivered, and then inputs the optical data signal to an optical synchronization signal distributor 22. At this time, the optical data signal processor 20 converts the received optical data signal into an electrical signal through opto-electrical conversion, then performs data processing on the converted electrical signal, converts the data-processed electrical signal into an optical signal through electro-optical conversion, and transmits the converted optical signal to the optical signal distributor 22.

The optical distributor 222 divides the optical synchronization signal input from the multiplexer 220 into a plurality of optical synchronization signals. The divided optical synchronization signals have the same properties while they have an optical power that is reduced according to a division ratio.

Each of the multiplexers 224-1, 224-2, . . . , and 224-*n* multiplexes the optical synchronization signal distributed from the optical distributor 222 and the optical data signal input from the optical data signal processor 20. Each of the multiplexers 224-1, 224-2, . . . , and 224-*n* is connected to a lower node connection point, for example, a next relay node or a slave node.

Figure 7:
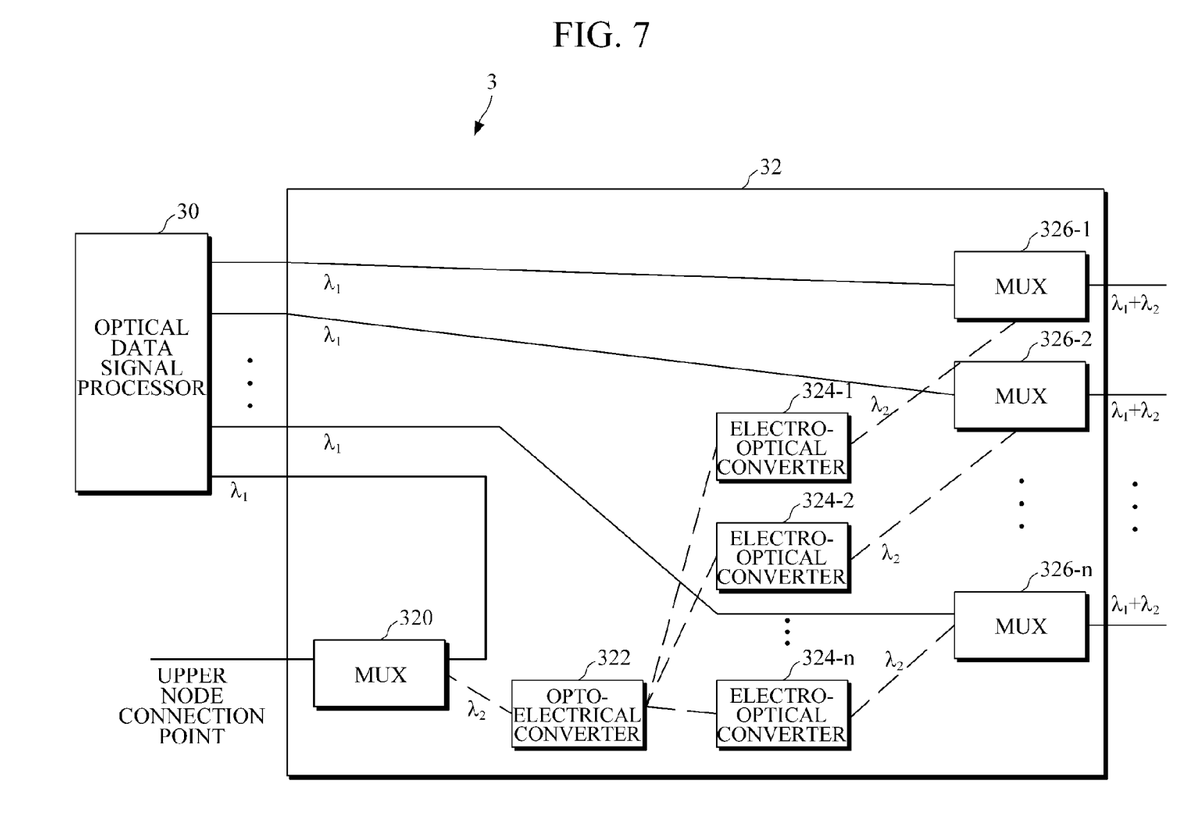
FIG. 7 is a diagram illustrating in detail an optical synchronization signal distributor according to another exemplary embodiment.

FIG. 7 is a diagram illustrating in detail an optical synchronization signal distributor according to another exemplary embodiment.

Referring to FIG. 7, a second relay node 3 includes an optical data signal processor 30 and an optical synchronization signal distributor 32. The optical synchronization signal distributor 32 with a structure capable of opto-electrically and electro-optically converting an optical synchronization signal includes multiplexers 320, 326-1, 326-2, . . . , and 326-*n*, an opto-electrical converter 322, and electro-optical converters 324-1, 324-2, . . . , and 324-*n*.

Unlike the optical synchronization signal distributor 22 of FIG. 6, the optical synchronization signal distributor 32 of FIG. 7 internally performs opto-electrical conversion and electro-optical conversion on an optical synchronization signal. This structure has a line card format on one shelf, allowing an optical data signal to be delivered to each line card through backplane. Dividing the optical synchronization signal and connecting each divided signal to a line card through an optical cable complicate the system. Thus, in the structure described above, it may be efficient to transmit a synchronization signal by internally performing simple internal opto-electrical conversion and an electro-optical conversion. This structure may be a method that can overcome optical power reduction of an optical synchronization signal when relay nodes are connected to each other through multiple stages.

In detail, referring to FIG. 7, the optical synchronization signal distributor 32 receives an optical signal from an upper node, and demultiplexes the received optical signal using the multiplexer 320 to separate an optical data signal and an optical synchronization signal. The separated optical data signal is input to an optical data signal processor 30. The optical data signal processor 30 performs data processing on the received optical data signal, and re-inputs a plurality of optical data signals divided from the processed optical data signal to the optical synchronization signal distributor 32. The separated optical synchronization signal is converted into an electrical signal by an opto-electrical converter 322, and then electrical signal is input to each of electro-optical converters 324-1, 324-2, . . . , and 324-*n* and then converted into an optical signal.

Thereafter, each of the multiplexers 326-1, 326-2, . . . , and 326-*n* receives an optical synchronization signal from each of the electro-optical converters 324-1, 324-2, . . . , and 324-*n*, and an optical data signal from the optical data signal processor 30. Then, each of the multiplexers 326-1, 326-2, . . . , and 326-*n* multiplexes the received optical synchronization signal and optical data signal. A plurality of optical signals multiplexed in the aforementioned manner are connected to lower node connection points and then delivered to lower nodes. In one example, an optical distributor may be further included between each of the electrical-optical converters 324-1, 324-2, . . . , and 324-*n* and each of the multiplexers 326-1, 326-2, . . . , and 326-*n* in order to control each opto-electrical converter to be connected to multiple multiplexers.

Figure 8:
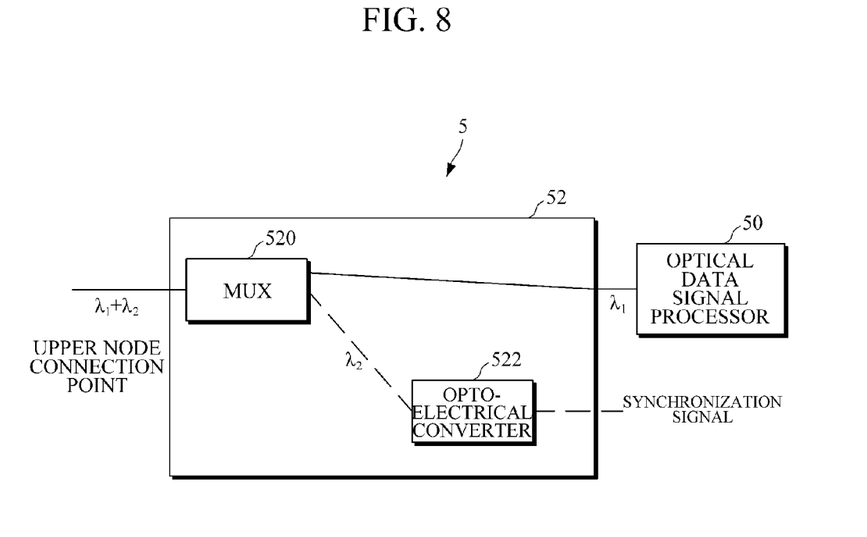
FIG. 8 is a diagram illustrating an optical synchronization signal processor according to an exemplary embodiment.

FIG. 8 is a diagram illustrating an optical synchronization signal processor according to an exemplary embodiment.

Referring to FIG. 8, a slave node 5 includes an optical data signal processor 50 and an optical synchronization signal processor 52. The optical synchronization signal processor 52 includes a multiplexer 520 and an opto-electrical converter 522.

The multiplexer 520 receives an optical signal from an upper node and demultiplexes the received optical signal to separate an optical data signal and an optical synchronization signal. The separated optical data signal is connected to a connection point, thereby being connected to the optical data signal processor 50. The separated optical synchronization signal is input to the opto-electrical converter 522. The opto-electrical converter 522 converts the received optical synchronization signal into an electrical signal, extracts a synchronization signal from the converted electrical signal, and then provides the extracted synchronization signal to the slave node 5.

Referring to FIGS. 5 to 8, according to the transmission path of the synchronization signal, the synchronization signal is distributed without data processing, or simply opto-electrically converted or electro-optically converted. Accordingly, each slave node receives the same synchronization signal from the master node, so that they can utilize the synchronization signal while minimizing a delay time. For example, in a packet switched data network, there may be used a method for clock synchronization in which a time for transmission between a master node and a slave node is determined through the synchronization signal, allowing the transmission time among the nodes to be the same. In such a structure, isochronous collection of data or states may be ensured as the slave nodes collect the data or the states nearly simultaneously and at the same time.

Wavelengths λ1 and λ2 of the optical signal used in the network described with reference to FIGS. 5 to 8 are exemplarily provided to distinguish between an optical data signal and an optical synchronization signal. In a specific interval or a specific module, a different wavelength may be used. In other words, any wavelengths will do as long the optical data signal and the optical synchronization signal have different wavelengths when the same optical cable is used.

The optical synchronization signal flows one way from a master node to a slave node. The optical data signal carries data in forward direction and also in reverse direction from a slave node to a master node. That is, the optical synchronization signal flows in only one direction, whereas data flows in two-way direction like in a general network.

Figure 9:
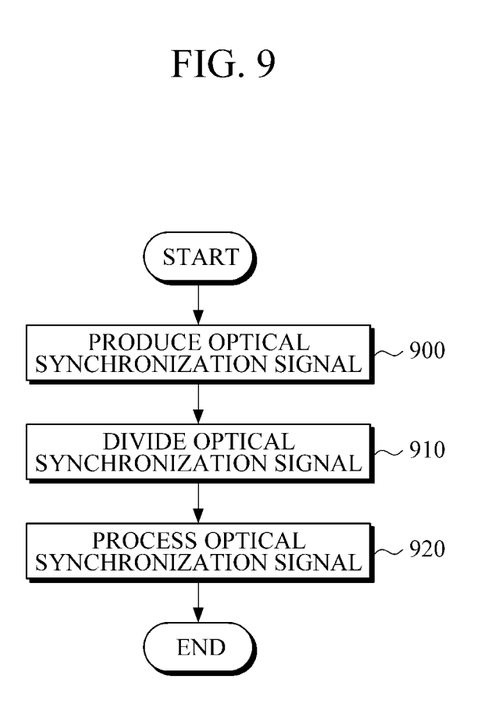
FIG. 9 is a flowchart illustrating a method for time synchronization between nodes according to an exemplary embodiment.

FIG. 9 is a flowchart illustrating a method for time synchronization between nodes according to an exemplary embodiment.

Referring to FIG. 9, in a network consisting of a plurality of nodes, a synchronization apparatus according to an exemplary embodiment produces an optical synchronization signal and multiplexes the optical synchronization signal and an optical data signal in 900. This process may be carried out in a master node. The time synchronization apparatus may produce the optical synchronization signal, divide the produced optical synchronization signal into a plurality of optical synchronization signals, multiplex each of the divided optical synchronization signals with each of the optical data signals and transmit a resulting multiplexed optical signal.

Then, the time synchronization apparatus demultiplexes the received optical signal to separate an optical synchronization signal and an optical data signal, divides the separated optical synchronization signal into a plurality of optical synchronization signals, and multiplexes the plurality of optical synchronization signals in 910. This process may be carried out in each relay node. In this case, the time synchronization apparatus receives a multiplexed optical signal from an upper node, demultiplexes the received optical signal to separate the optical data signal and the optical synchronization signal, and divides the separated optical synchronization signal into a plurality of optical synchronization signals. In addition, each of the optical synchronization signals may be multiplexed with each optical data signal that has been through data processing, and then a resultant optical signal may be transmitted.

In other example, the time synchronization apparatus demultiplexes the multiplexed optical signal to separate an optical synchronization signal and an optical data signal, opto-electrically and then electro-optically converts the separated optical synchronization signal, and then multiplexes a plurality of optical synchronization signals resulting from electro-optical conversion. In this case, the time synchronization apparatus receives a multiplexed optical signal from an upper node, demultiplexes the received optical signal to separate an optical data signal and an optical synchronization signal, and opto-electrically converts the separated optical synchronization signal into an electrical signal. Then, the time synchronization apparatus electro-optically converts the converted electrical signal into a plurality of optical synchronization signals, then multiplexes each of the plurality of optical synchronization signals with each of optical data signals which have been through data processing, and transmits a resultant multiplexed optical signal.

Thereafter, the time synchronization apparatus demultiplexes the multiplexed optical signal to separate an optical synchronization signal and an optical data signal, and extracts a synchronization signal in the form of an electrical signal from the separated optical synchronization signal in 920. This process may be carried out in each slave node. In this case, the time synchronization apparatus receives a multiplexed optical signal from an upper node, demultiplexes the received optical signal to separate an optical data signal and an optical synchronization signal. Then, the time synchronization apparatus opto-electrically converts the separated optical synchronization signal to extract a synchronization signal in the form of an electrical signal.

According to the exemplary embodiments described above, in a network consisting of a plurality of nodes, a master node transmits an optical synchronization signal to multiple slave nodes in a distributed manner, so that the identical synchronization signal can be delivered to each slave node at the same speed, thereby enabling synchronization between the nodes without time delay and synchronization errors.

Further, in a situation where an opto-electrical conversion and/or an electro-optical conversion are inevitably needed in a relay node, such conversions are performed in a way that can minimize a time delay, so that a synchronization packet generated in the master node can be delivered to the multiple slave nodes without time delay in the relay node, and thereby synchronization among the slave nodes can be ensured.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for time synchronization between a master node and a plurality of slave nodes in a network, the method comprising:
    separating an optical signal into an optical synchronization signal for node synchronization and an optical data signal for data transmission;
    transmitting the optical data signal along a data path;
    transmitting the optical synchronization signal along a path different from the data path; and
    synchronizing time between master node and the slave the nodes using an electrical synchronization signal that is extracted from the optical synchronization signal.

2. The method of claim 1, wherein the transmitting of the optical synchronization signal comprises transmitting the optical synchronization signal through optical distribution along the path different from the data path.

3. The method of claim 1, wherein the transmitting of the optical synchronization signal comprises transmitting the optical synchronization signal through opto-electrical conversion and electro-optical conversion along the path different from the data path.

4. The method of claim 1, wherein the optical synchronization signal has a wavelength different from a wavelength of the optical data signal.

5. The method of claim 1, wherein the nodes are connected to each other via an optical cable.

6. A method for time synchronization between a master node and a plurality of slave nodes, the method comprising:
multiplexing, at the master node, an optical synchronization signal with an optical data signal and transmitting a resultant multiplexed optical signal to a relay node;
receiving, at the relay node, the resultant multiplexed optical signal, demultiplexing the received optical signal to separate it into an optical synchronization signal and an optical data signal, performing data processing on the separated optical data signal, and multiplexing the data-processed optical data signal with the separated optical synchronization signal, and transmitting a resultant multiplexed optical signal to the slave nodes; and
receiving, at the slave nodes, the resultant multiplexed optical signal, demultiplexing the received multiplexed optical signal to separate it into an optical data signal and an optical synchronization signal, and synchronizing time between the master node and the slave nodes using an electrical synchronization signal that is extracted from the separated optical synchronization signal.

7. The method of claim 6, wherein the transmitting of the resultant multiplexed optical signal to the second node comprises:
producing the optical synchronization signal, dividing the produced optical synchronization signal into a plurality of optical synchronization signals, and multiplexing each of the plurality of divided optical synchronization signals with the data optical signal and transmitting the resultant multiplexed optical signal to the second node.

8. The method of claim 7, wherein the plurality of divided optical synchronization signals have the same properties, but may have different optical powers according to a division ratio.

9. The method of claim 6, wherein the transmitting of the resultant multiplexed optical signal to the third node comprises:
receiving, at the second node, the multiplexed optical signal from the first node, demultiplexing the received multiplexed optical signal to separate it into the optical data signal and the optical synchronization signal, dividing the separated optical synchronization signal into a plurality of optical synchronization signals, performing the data-processing on the separated optical data signal, and multiplexing each of the plurality of divided optical synchronization signals with the data-processed optical data signal and transmitting the resultant multiplexed optical signal to the third node.

10. The method of claim 9, wherein the plurality of divided optical synchronization signals have the same properties, but different optical powers according to a division ratio.

11. The method of claim 6, wherein the transmitting of the resultant multiplexed optical signal to the third node comprises:
receiving, at the second node, the multiplexed optical signal from the first node, demultiplexing the received multiplexed optical signal to separate it into the optical data signal and the optical synchronization signal, opto-electrically converting the separated optical synchronization signal into an electrical signal, and electro-optically converting the converted electrical signal into a plurality of optical synchronization signals, performing the data processing on the separated optical data signal, and multiplexing each of the plurality of electro-optically converted optical synchronization signals with the data-processed optical data signal and transmitting the resultant multiplexed optical signal to the third node.

12. The method of claim 6, wherein the synchronizing of the time between the nodes comprises:
receiving, at the third node, the multiplexed optical signal from the second node, demultiplexing the received multiplexed optical signal to separate it into the optical data signal and the optical synchronization signal, opto-electrically converting the separated optical synchronization signal to extract the synchronization signal in form of an electrical signal, and synchronizing time between the nodes using the extracted synchronization signal in form of an electrical signal.

13. An apparatus for time synchronization between a master node and a plurality of slave nodes in a network, the apparatus comprising:
an optical synchronization signal creator configured to multiplex an optical synchronization signal and an optical data signal and externally transmit a resultant multiplexed optical signal;
an optical synchronization signal distributor configured to receive the resultant multiplexed optical signal from the optical synchronization signal creator, demultiplex the received multiplexed optical signal to separate it into an optical data signal and an optical synchronization signal, perform data processing on the separated optical data signal, multiplex the separated optical synchronization signal with the data-processed optical data signal, and externally transmit a next resultant multiplexed optical signal; and
an optical synchronization signal processor configured to receive the next resultant multiplexed optical signal from the optical synchronization signal distributor, demultiplex the received next resultant multiplexed optical signal to separate it into an optical data signal and an optical synchronization signal, extract an optical synchronization signal in form of an electronic signal from the separated optical synchronization signal, and synchronize time between the master node and the slave nodes using an electrical synchronization signal that is extracted from the optical synchronization signal.

14. The apparatus of claim 13, wherein the optical synchronization signal creator comprises:
an optical synchronization signal generator configured to generate the optical synchronization signal, an optical distributor configured to divide the optical synchronization signal generated by the optical synchronization signal generator into a plurality of optical synchronization signals, and at least one multiplexer configured to multiplex each of the plurality of divided optical synchronization signals with the optical data signal and externally transmit a resultant multiplexed optical signal.

15. The apparatus of claim 14, wherein the plurality of divided optical synchronization signals from the optical distributor have the same properties, but different optical powers according to a division ratio.

16. The apparatus of claim 13, wherein the optical synchronization signal distributor comprises:
a multiplexer configured to receive the multiplexed optical signal from an upper node, and demultiplex the received multiplexed optical signal to separate it into an optical data signal and an optical synchronization signal, an optical distributor configured to divide the separated optical synchronization signal into a plurality of optical synchronization signals, and at least one multiplexer configured to multiplex each of the plurality of divided optical synchronization signals with the data-processed optical data signal and externally transmit a next resultant multiplexed optical signal.

17. The apparatus of claim 16, wherein the plurality of divided optical synchronization signal from the optical distributor have the same properties, but different optical powers according to a division ratio.

18. The apparatus of claim 13, wherein the optical synchronization signal distributor comprises:
  a multiplexer configured to receive a multiplexed optical signal from an upper node and demultiplex the received multiplexed optical signal to separate it into an optical data signal and an optical synchronization signal, an opto-electrical converter configured to opto-electrically convert the optical synchronization signal separated by the multiplexer into an electrical signal, an electro-optical converter configured to electro-optically convert the electrical signal from the opto-electrical converter into a plurality of optical synchronization signals, and at least one multiplexer configured to multiplex each of the plurality of optical synchronization signals from the electro-optical converter with a data-processed optical signal and externally transmit a next resultant multiplexed optical signal.

19. The apparatus of claim 13, wherein the optical synchronization signal processor comprises:
  a multiplexer configured to receive a multiplexed optical signal from an upper node and demultiplex the received multiplexed optical signal to separate it into an optical data signal and an optical synchronization signal; and
  an opto-electrical converter configured to opto-electrically convert the optical synchronization signal separated by the multiplexer and extract a synchronization signal in form of an electrical signal, and the optical synchronization signal process is configured to synchronize time between the nodes using the extracted synchronization signal in form of an electrical signal.

\* \* \* \* \*